US005567876A

United States Patent [19]
Holmes-Higgin et al.

[11] Patent Number: 5,567,876
[45] Date of Patent: Oct. 22, 1996

[54] FLUID METERS AND PUMPS

[75] Inventors: Ian J. Holmes-Higgin, West Hampstead; Ivor T. Rogers, Bedfordshire, both of United Kingdom

[73] Assignee: ABB Kent Plc, Bedfordshire, United Kingdom

[21] Appl. No.: 244,287

[22] PCT Filed: Sep. 22, 1993

[86] PCT No.: PCT/GB93/01988

§ 371 Date: Nov. 21, 1994

§ 102(e) Date: Nov. 21, 1994

[87] PCT Pub. No.: WO94/07111

PCT Pub. Date: Mar. 31, 1994

[30] Foreign Application Priority Data

Sep. 22, 1992 [GB] United Kingdom .................. 9220048
Sep. 22, 1992 [GB] United Kingdom .................. 9220051

[51] Int. Cl.$^6$ ........................................................ G01F 3/08
[52] U.S. Cl. ................................................................ 73/257
[58] Field of Search ............................... 73/257, 258, 273

[56] References Cited

U.S. PATENT DOCUMENTS

| 1,238,203 | 8/1917 | Selby | 73/258 |
| 1,973,670 | 9/1934 | Star | 73/257 |

*Primary Examiner*—Richard Chilcot
*Assistant Examiner*—Harshad Patel
*Attorney, Agent, or Firm*—Hodgson, Russ, Andrews, Woods & Goodyear LLP

[57] ABSTRACT

A volumetric water meter of the type having an eccentric piston oscillating in a cylindrical chamber has a drive peg (64) on the piston engaging a rotor arm (50) which rotates about the chamber axis to drive an external register or the like. The drive peg is offset from the piston axis by that amount necessary to compensate for the periodic variation in angular velocity of the piston. The likelihood of the peg becoming disengaged from the rotor arm is thus considerably reduced.

4 Claims, 5 Drawing Sheets

FLUID METERS AND PUMPS

This invention relates to fluid devices and in the most important example to volumetric fluid meters.

Typically, a volumetric water meter comprises an eccentric piston oscillating within a chamber which has inlet and outlet ports. The piston moves circumferentially about the axis of the chamber and sweeps a known volume as fluid passes from the inlet to the outlet port. A magnetic or other external connecting element is rotationally driven by the piston through a drive coupling which conventionally takes the form of a peg or post on the piston engaging a radial arm of the connecting element.

Because of the nature of the fluid forces acting upon the piston, the angular velocity of its circumferential movement is not constant but varies with the angular rotation. Typically, the angular velocity will vary between one maximum and one minimum in each cycle, the maximum and the minimum being diametrically opposed.

This angular velocity modulation can create severe operating difficulties. For example, the driven radial arm can become disengaged from the piston drive peg, when the angular velocity of the piston reduces, as a result of the angular momentum of the connecting element, and of the register or other elements to which it is magnetically coupled. The piston drive peg will then re-engage the radial arm when the piston angular velocity increases. This cyclical disengagement and re-engagement can lead to problems of:

(i) wear or damage to the radial arm and the piston drive peg;

(ii) significantly increased operating noise;

(iii) abnormal wear to components of the register;

(iv) loss of the magnetic coupling.

If the magnetic coupling is lost, it may possibly not be re-established until the water flow drops substantially to zero. This loss of coupling of course results in an understatement of the water flow, which may be significant.

Certain of these problems have been identified previously and reference is directed to U.S. Pat. No. 4,738,136 which proposes a solution. In the arrangement disclosed in this prior art reference, the radial arm is made convex at the point of driving engagement with the piston drive post, the arc of curvature of the contact surface being essentially complementary to the arc of curvature of the drive post. In this way, it is suggested that the hitherto point contact between the piston drive post and the radial arm is replaced by a more extensive area of contact. It is explained that in addition to dissipating the energy of re-engagement over a wider contact area, this arrangement provides a cushioning effect in that a significant volume of liquid must be squeezed out of the space between the post and the convex surface before contact can be re-established. Similarly, it is hypothesised, the arm is less likely to lose contact with the post because of the need for liquid to be pulled into the space between the convex surface and the post as the two disengage.

It is believed that, whilst this prior art arrangement represents an improvement over what has gone before, it is not an ideal solution to the problems outlined above. It is clear, for example, that the variations in torque which are the cause of the tendency for disengagement, remain undiminished. Whilst the viscous effects described in the prior art reference may be of some assistance, it is not believed that they can be relied upon to solve the specific problems which this invention addresses.

It is an object of one aspect of the present invention to provide an improved fluid device in which the problem of non-uniform angular velocity and the consequential tendency to lose engagement, is tackled directly and in a way which offers a more comprehensive solution.

Accordingly, the present invention consists in one aspect in a fluid device comprising a cylindrical chamber with an axis and having a fluid inlet port and a fluid outlet port; a piston eccentrically disposed within the chamber and having a cylindrical piston wall in sealing engagement with an interior surface of the chamber such that circumferential movement of the piston about said axis sweeps a fixed volume of fluid passing from the fluid inlet port to the fluid outlet port, the angular velocity of the piston in said circumferential movement varying with the angle of rotation; a rotatable drive member extending outwardly of the chamber for external drive connection with the piston and coupling means acting between the piston and the drive member, said coupling means comprising respective abutment surfaces of the piston and the drive member; characterised in that the point of contact between said abutment surfaces is offset radially from said axis in a direction to compensate for said variation in angular velocity.

In this way, the radius of action between the abutment surfaces is varied concomitantly with the variation in angular velocity, such that as the angular velocity increases, the radius of action is increased in compensation. The tendency for disengagement is therefore considerably reduced.

Because of design constraints imposed by other elements in the meter, it may not be possible to compensate identically for the angular velocity variation. In a preferred form, the present invention therefore provides an additional feature to limit the angular extent to which the abutment surfaces can become disengaged.

Therefore, preferably, the abutment surface on the piston comprises an axially extending peg and the abutment surface of the drive member comprises one edge of a radially extending slot in the drive member, an opposite parallel edge of the slot coming into engagement with the peg of the piston after an initial disengagement of said abutment surfaces.

A variety of configurations are employed in known volumetric water meters, with the meter chamber axis being sometimes parallel to the direction of overall flow through the meter and sometimes orthogonal. In one known configuration, the working chamber is disposed within a meter body having diametrically opposed inlet and outlet ports, the axis of the working chamber being orthogonal to the line joining these ports. Typically, a working chamber designed for use in this configuration, will have parallel inlet ports, one in the upper wall of the working chamber and one in the lower. The inlet port in the meter body will feed an interior volume of the body from which water flows in parallel through the two inlet ports of the working chamber. A single outlet port from the working chamber is in direct communication with the outlet port of the meter body.

The shaping and positioning of the inlet ports to the working chamber are critical if accurate and efficient metering is to be assured. The parameters which are normally regarded as dictating the shape and position of the inlet ports apply identically to the inlet and outlet ports. It is surprisingly found, however, that as the shape and position of identical upper and lower ports approaches the theoretical optimum, problems arise. For example, it is found that at high flow rates there is an unacceptable increase in noise level.

It is an object of another aspect of this invention to provide an improved fluid device in which the problem of increased noise levels at high flow rates is attacked.

Accordingly, the present invention consists in another aspect in a fluid device comprising a cylindrical chamber with an axis and having top and bottom chamber walls disposed orthogonally of said axis; first and second port means providing for a fluid flow through said chamber; and a piston eccentrically disposed within the chamber and having a cylindrical piston wall in sealing engagement with an interior surface of the chamber such that circumferential movement of the piston about said axis sweeps a fixed volume of fluid passing between the first and second fluid port means, wherein said first port means comprises upper and lower ports provided in the top and bottom chamber walls and being generally of like shape and disposition to provide parallel flow paths, characterised in that said upper and lower ports have small differences in shape or position such that flows along said parallel flow paths have small differences in their time dependence.

It can, for example, be arranged in accordance with this invention for flow through the upper inlet port to be cut off more rapidly on movement of the piston than flow through the lower inlet port. It is surprisingly found that this departure from the theoretically optimum form for one or both inlet ports, significantly reduces high flow rate noise without introducing unacceptable errors in metering.

The invention will now be described by way of examples with reference to the accompanying drawings in which.

Referring to FIGS. 1 to 4, a volumetric water meter 10 comprises a cylindrical chamber 12 and a cylindrical piston 18 which is mounted for eccentric movement within the chamber 12. Successive stages in the path of this eccentric movement of the piston are illustrated in respective FIGS. 1 to 4.

Figure 1:
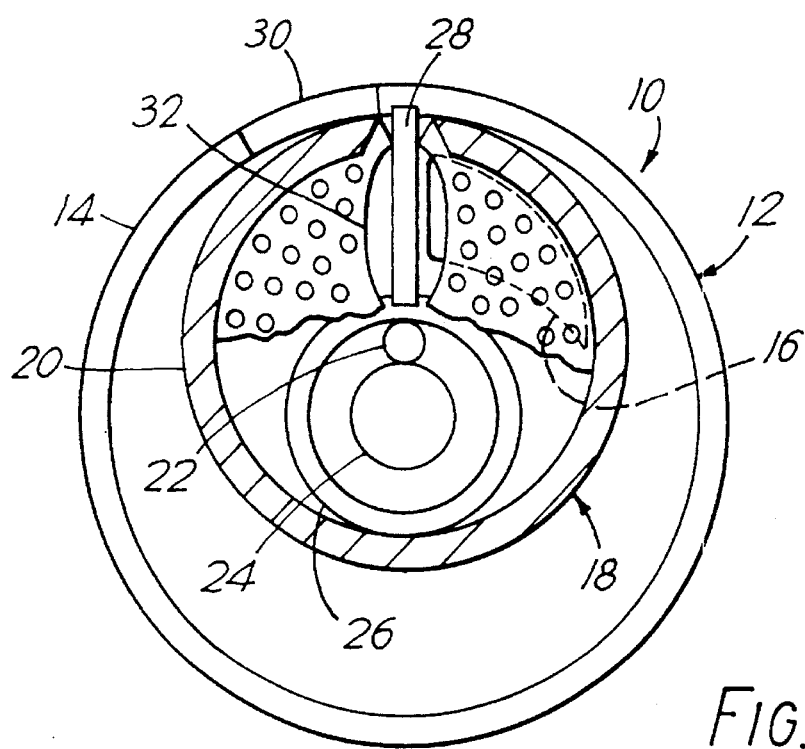
FIGS. 1 to 4 are somewhat diagrammatic views illustrating the known method of operation of a volumetric water meter.

Turning initially to FIG. 1, the cylindrical chamber 12 has a cylindrical wall 14. A half-crescent shaped inlet port 16 is provided in the base of the chamber 12 and is open to the interior of the piston 18. This piston has a cylindrical wall 20 and an axial pin 22 which runs in an annular track formed in the base of the chamber between axial boss 24 and collar 26. A fixed dividing plate or shutter 28 extends radially between the collar 26 and the cylindrical wall 14, adjacent the inlet port 16. An outlet port 30 is provided in the cylindrical wall 14 to the opposite side of the dividing shutter 28. The piston 18 has a slot 32 in the piston wall 20, enabling the piston to slide radially of the shutter 28 in its circumferential movement. In this movement, a fixed volume of water is swept from the inlet port 16 to the outlet port 30, as will now be described in more detail.

In the position shown in FIG. 1, in-flowing water causes the piston 18 to start its oscillatory movement, sliding on the dividing shutter 28. Simultaneously, exhaust water in the remaining part of the piston is being expelled through the outlet port 30.

Figure 2:
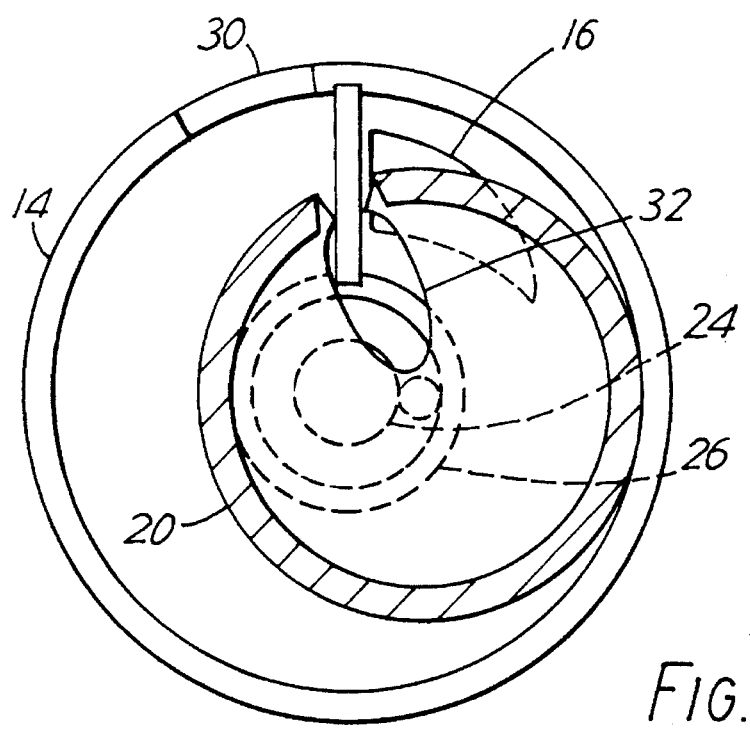

In the position shown in FIG. 2, the piston has moved around a quarter of its path; the inflowing water continues to fill the interior of the piston 18 and commences filling the region between the shutter 28 and the upstream side of the sealing line between the piston 18 and the chamber 12. Water downstream of the sealing line begins to be expelled through the outlet port 30.

Figure 3:
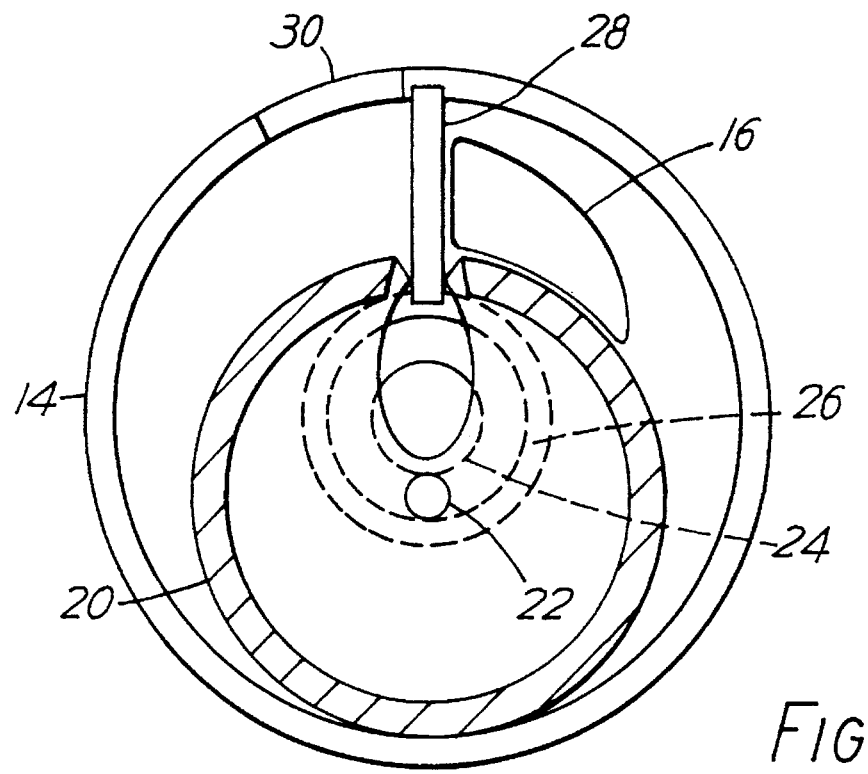
Figure 4:
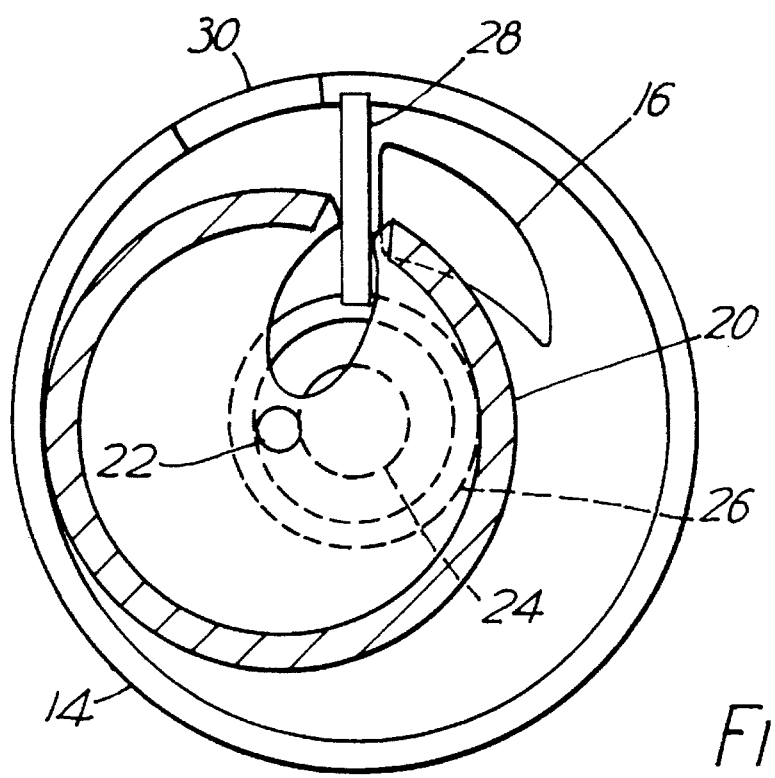

FIG. 3 shows the half-way position in which the interior of the piston 18 is cut off from both ports. In the three-quarter position shown in FIG. 4, the interior of the piston is opening to the inlet port 16 for the beginning of another cycle.

Figure 5:
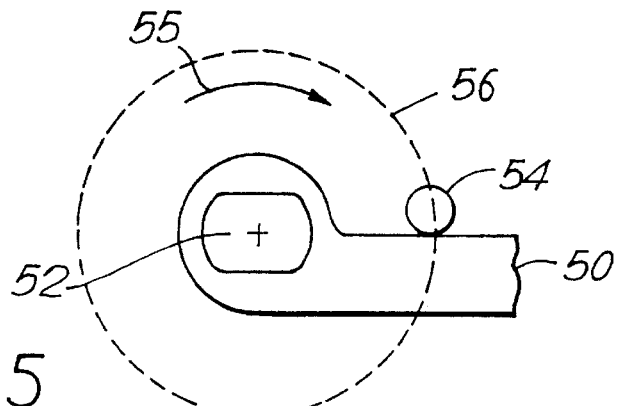
FIG. 5 is a sketch view of a prior art coupling arrangement.

It is necessary for the movement of the piston 18 to be communicated to the exterior of the working chamber 12 for counting. Typically, a coupling element is rotatably mounted in the upper wall of the working chamber, having a magnetic element to the outside and a radial arm to the inside which is driven by a peg or post on the piston. A typical prior art arrangement is illustrated in FIG. 5. This shows, in sketch form, a driven bar 50 which is mounted for rotation about the chamber axis 52 in the upper wall of the working chamber 12 and which is integral with an external magnetic element. A piston drive peg 54 is located axially of the piston so as to describe a circle about the axis of the working chamber as the piston is driven in the direction of arrow 55 by the flow of water. The circular path of the piston drive peg 54 is shown in dotted outline at 56 in the figure. The peg 54 is coincident with the pin 22 which runs in the annular track between the boss 24 and the collar 26 in the base of the chamber. The circular path 56 described by the drive peg 54 is therefore centred on the axis 52 of the chamber. As has previously been explained, however, the angular velocity of the piston drive peg about the axis of the working chamber is not constant. The angular velocity of the piston in an arrangement such as that shown in FIGS. 1 to 4 might be expected to be at a maximum in the position shown in FIG. 1, falling to a minimum at the position shown in FIG. 3. As has also been explained, this variation in angular velocity can create severe operating difficulties. Particularly, the driven radial bar 50 can become disengaged from the drive peg 54, the angular momentum of the connecting element of which the driven bar 50 is a part, tending to keep the driven bar moving forward at constant angular velocity.

Figure 6:
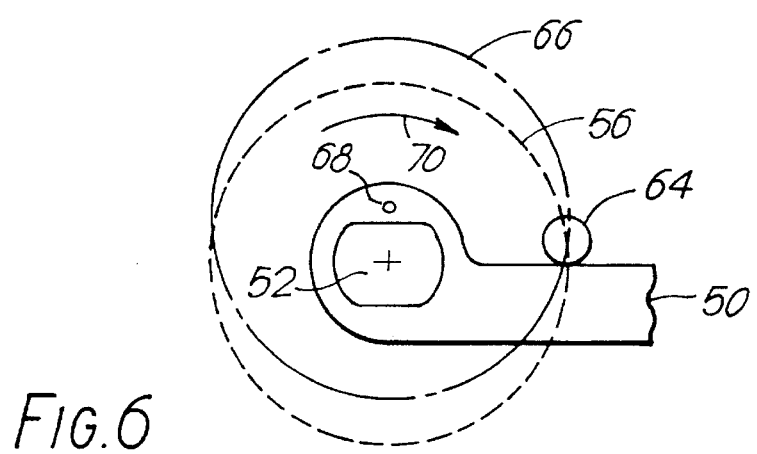
FIG. 6 is a sketch view illustrating an arrangement according to the present invention.

Reference is now directed to FIG. 6 which is a view similar to FIG. 5 but illustrating an arrangement according to this invention. For ease of comparison, FIG. 6 shows the same driver bar 50 mounted for rotation about the chamber axis 52. There is also shown in dotted outline the circle 56 centred on axis 52.

According to this aspect of the invention, piston drive peg 64 is offset radially from the axis of the piston 18, thus to say the piston drive peg is now eccentric. The piston drive peg 64 is no longer coincident with the axial pin 22. The piston drive peg 64 moves in a circular path 66 about an offset centre 68 as the piston is driven circumferentially of the working chamber. The point of contact between the piston drive peg 64 and the driven bar 50 therefore varies in radial position as the piston rotates, as indicated by arrow 70. At the position of maximum angular velocity of the piston, the radius of action—that is to say the radial distance from the working chamber axis to the point of contact between the drive peg and the driven bar—is at a maximum. Similarly, the radius of action is at a minimum at the point of minimum angular velocity of the piston. In this way, there is an automatic compensation for the angular velocity variation and the tendency for disengagement of the drive peg and driven bar is significantly reduced, if not eliminated.

The present invention, in its preferred forms, encompasses other modifications.

Figure 8:
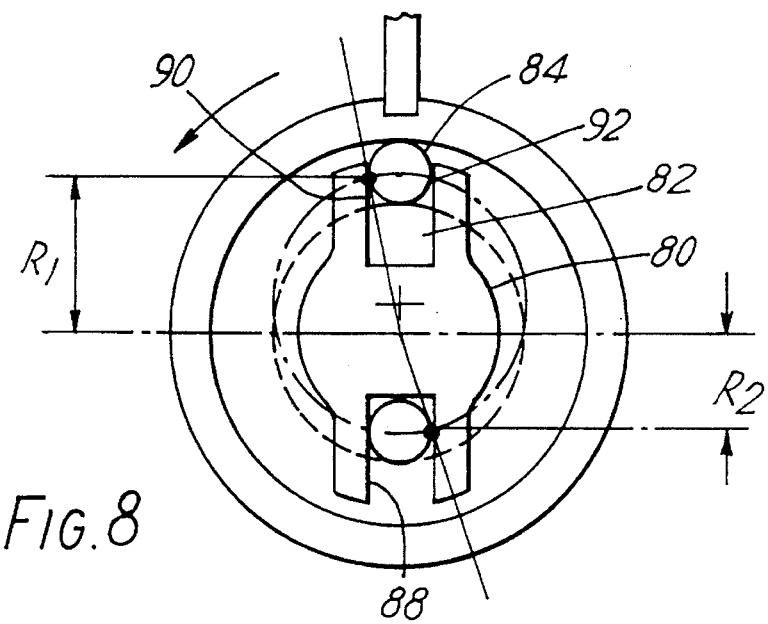
FIG. 8 is a view of a modified coupling arrangement according to the present invention.

Referring to FIG. 8, it will be seen that the present invention proposes replacing the radial drive bar of the prior art with a drive element 80 having a radially directed slot 82 to receive the offset piston drive peg 84. The drive element 80 is rotationally symmetric, having an unused drive slot 88. This symmetry provides for more balanced running and assists in the assembly procedure.

During normal operation, there is continuous drive engagement between the piston drive peg 84 and face 90 of the slot 82. If, because of incomplete compensation of the angular velocity variation or other perturbation of the piston movement, the piston drive peg disengages from the face 90, the opposing face 92 will come rapidly into engagement with the drive peg. This limits the extent of any disengagement.

FIG. 8 also shows the different radius of action that applies at the differing positions of the drive peg 84. Thus it can be seen that the radius of action $R_1$ at the position of maximum angular velocity is significantly greater than the radius of action $R_2$ at the position of minimum angular velocity.

Figure 7:
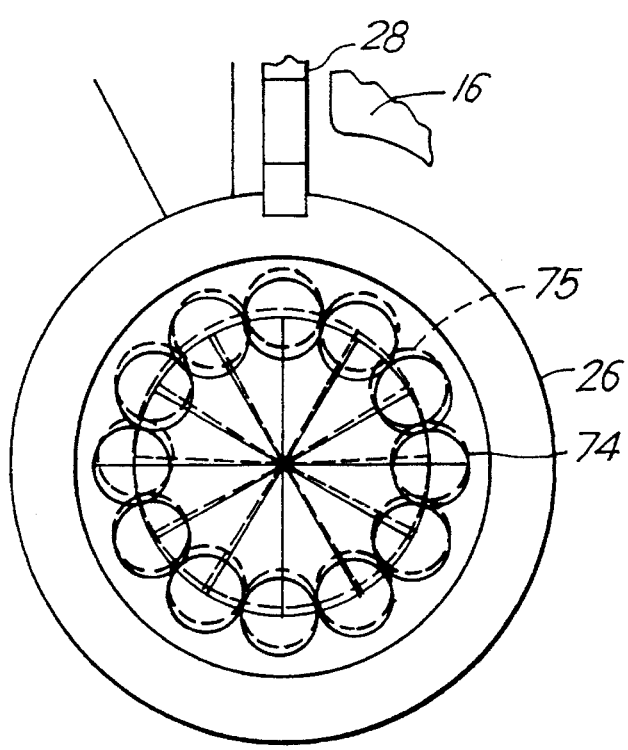
FIG. 7 is a diagram in which rotational paths are plotted for arrangements according to the prior art and according to the present invention.

A secondary effect of offsetting the piston drive peg is that the peg is cyclically advanced and retarded in the circumferential direction, with reference to the position of a notional concentric peg. This is illustrated in FIG. 7 which is a plot showing in full outline a succession of positions of a concentric peg 74 on rotation of the piston, with corresponding positions of an offset 75 peg being shown in dotted outline. The compensatory effect of this circumferential advance and retard is not in exact register with the angular velocity variation of the piston. The relative weights of the "radius of action" effect described above and this "advance and retard" effect will vary in accordance with other design parameters of a particular meter and the correct radial offset can be chosen to optimize the resultant of the two effects. It is believed that in most cases, the "radius of action" effect will be dominant.

It will be recognised that offsetting the circular path of the drive peg relatively to the axis of the chamber has the effect of offsetting radially the point of contact between an abutment surface on the piston—that is to say the drive peg—and an abutment surface on the drive element. The same effect can of course be achieved in other ways. Thus, the offset drive peg could be replaced by a cam having an ovoid or elliptical cam surface. Other mechanical variants will occur to the skilled man by which the radial point of drive contact can be adjusted as the piston rotates to compensate for the variations in angular velocity and to maintain sensibly constant the speed at the point of drive contact.

Figure 9:
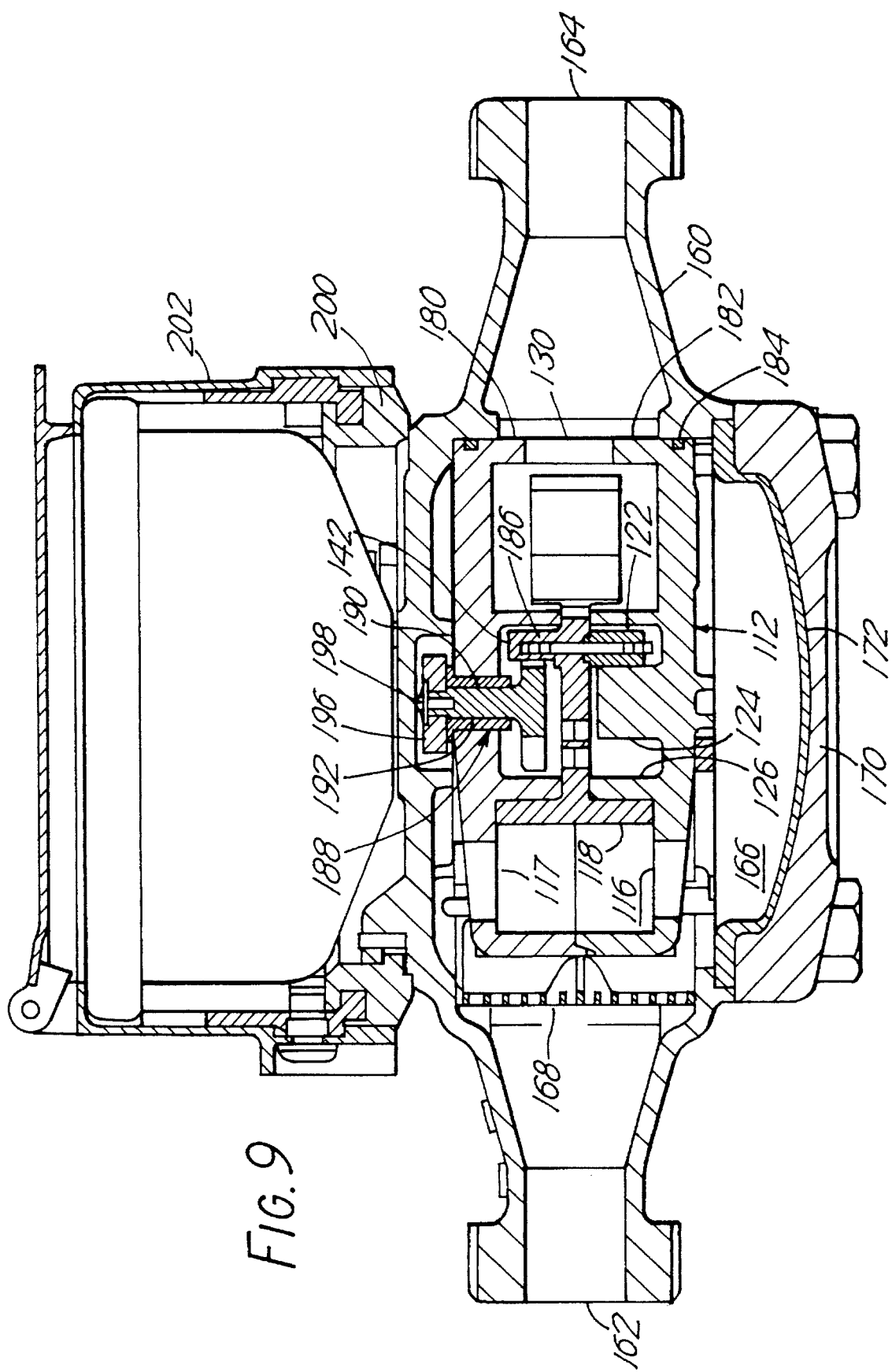
FIG. 9 is a detailed sectional view through a volumetric water meter according to the present invention.

Turning now to FIG. 9, there will be described in more detail a water meter according to the invention.

The working chamber 112 is disposed in a meter body 160 having an inlet port 162 and a diametrically opposed output port 164. The meter body defines an interior volume 166 with water flowing from the inlet port 162 passing through a strainer 168 before entering the inner volume 166. Beneath the working chamber 112, the volume 166 is closed by a pressure plate 170 having an inner seal 172. Conveniently, the pressure plate 170 is formed of a relatively weak material so as to fracture if pressure is built up through freezing of the water contained in the meter. In known manner, the pressure plate 170 may have defined weakening formations.

The working chamber is arranged as generally shown in FIGS. 1 to 4. The working chamber is formed of two shell-like parts, an upper part 180 and a lower part 182. An inlet port 116 is formed in the lower chamber part 182 and receives water from the inner volume 166. A corresponding inlet port 117 is formed in the upper chamber part 180. The outlet port 130 lies adjacent to the outlet port 164 of the body, an O-ring seal 184 ensuring that water can only exit through the outlet port 164 after having been swept through the working chamber 112.

The shape of the inlet ports 116, 117 is critical, and it is well understood in the art that great care must be taken in matching an arcuate edge of the inlet ports with the periphery of the piston, if accurate metering is to be ensured. In accordance with a feature of the present invention, however, the two inlet ports 116, 117 take different shapes, one or both having edges which deliberately depart from the conventionally defined optimum form.

Figures 10, 11:
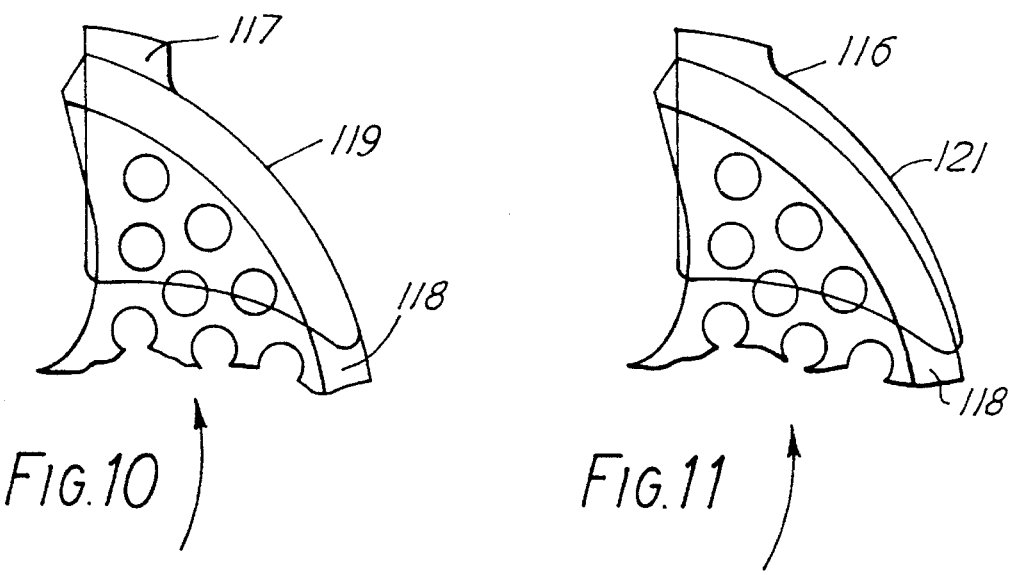
FIGS. 10, 11 and 12 are scrap views illustrating a port arrangement according to the present invention.
Figure 12:
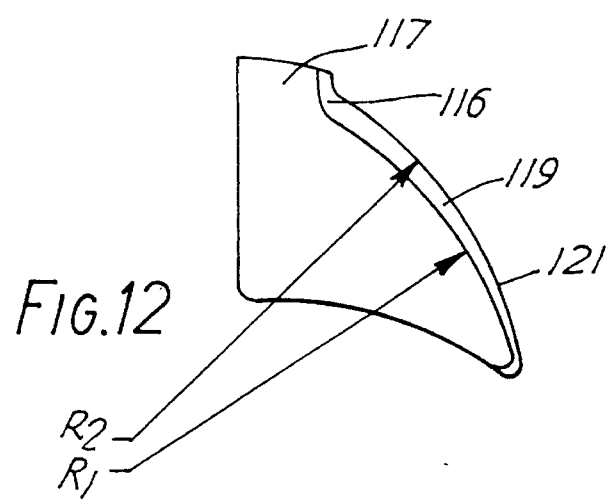

Referring now to FIGS. 10, 11 and 12, there is shown a port arrangement according to one aspect of the present invention. It will be seen that the inlet port 117 in the top of the chamber, is not coincident in plan view with the lower inlet port 116. This has the effect that, as the piston returns at maximum angular velocity to the position shown in FIG. 1, the parallel flow paths to the outside of the piston are cut off at slightly different times. The difference is not such as to introduce unacceptable leakage or other sources of inaccuracy, but does nonetheless serve to reduce significantly the level of operating noise at higher flow rates.

It is believed that the upper and lower inlet ports should differ principally in the disposition of the arcuate edge or radius which corresponds with the piston wall in the "top" position of the piston, that is to say the position shown in FIG. 1, in which the piston lies most outwardly of the dividing shutter. It has also been surprisingly found that by manipulating, in a design procedure, these two edges or radii separately rather than as a pair, the resolution of adjustment to meter accuracy is increased. It is thus believed that it is easier to control meter accuracy with one inlet port slightly larger than optimum, and one slightly smaller. It will be recognized that the need to control meter accuracy arises frequently since it is not possible to maximize meter accuracy simultaneously over the entire flow rate range. It is a frequent requirement for meter accuracy to be improved for a particular flow rate, at the cost of reduced accuracy at other points in the working range.

Referring specifically to FIG. 10, the upper inlet port 117 is shown at the position in which the arcuate edge 119 is in alignment with the periphery of the piston 118. FIG. 11 shows for the same piston position the orientation of lower inlet port 116. It will be seen that the arcuate edge 121 is displaced both radially and angularly with respect to the periphery of the piston 118. The difference between the leading edges 119 of the upper port 117 and 121 of the lower port 116 is seen most clearly in FIG. 12 where the two ports are shown superimposed. FIG. 12 also shows the respective radius of curvature $R_1$ and $R_2$.

Returning to FIG. 9, the piston 118 is guided in its circumferential movement through axial pin 122 engaging in the annular groove defined between boss 124 and collar 126. Pin 122 is not formed integrally with piston 118 but is carried on a reinforcing spindle 186. This enables the material of pin 122 to be selected so as to optimize its bearing qualities. The reinforcing spindle 186 extends upwardly through drive peg 142, although the drive peg 142 is of course eccentrically disposed with respect to the spindle 186.

The coupling element 188 has a shank portion 190 which extends within a bearing sleeve 192 formed in the upper chamber part 180. At its free end, the shank 190 is provided with flats to form a drive coupling with magnetic disk 196. A stud 198 is a pressure fit within an aperture formed in the free end of the shank 190 to prevent accidental dislodgement of the magnetic disk. This is particularly important during assembly. In normal operation, the domed end of the stud 198 is in bearing engagement with the underside of the meter body 160.

As shown in rather schematic form, the meter body carries an adapter ring 200 forming a mounting for a register 202. In conventional manner, not shown in the drawing, this register includes a counting mechanism having a magnetic coupling element complementary to the magnetic disk 196.

It is found in operation of the described meter that, in comparison with a meter differing only in that the drive peg 142 is concentric, there is a substantial decrease in operating noise—and it is anticipated—a decrease in wear.

The location of the drive peg within a slot in the coupling element provides additional assurance against loss of magnetic coupling but will not always be necessary.

A still further advantage is seen in the novel port arrangement disclosed herein. Because of the requirement in certain applications to have a removable pressure plate such as plate 170, there is in the inner volume 166 a larger flow path leading to the lower inlet port 116 than to the upper inlet port 117. In the known arrangement having coincident ports, this can lead to uneven flows into the working chamber. In accordance with the present invention the referred-to edges or radii of the two ports can be varied in such a manner as to produce an upper port of greater effective area than the lower port. This compensates, in part at least, for the differing flow rates through the inner volume 166.

Still further modifications are possible without departing from the scope of the invention. Thus the desired effect of offsetting radially the point of contact between the abutment surfaces of the piston and of the coupling element can be achieved in ways other than offsetting a drive peg constituting the piston abutment surface. Cam arrangements could alternatively be employed with the necessary eccentricity being provided in the coupling element abutment surface rather than the piston surface. Similarly, different ways of providing small differences in shape or position of the upper and lower ports will be possible in which the desired small differences in time dependence will be achieved to reduce noise without sacrificing accuracy. Yet further modifications will be apparent to the man skilled in the art.

What is claimed is:

1. A fluid device comprising a cylindrical chamber with an axis and having a fluid inlet port and a fluid outlet port; a piston eccentrically disposed within the chamber and having a cylindrical piston wall in sealing engagement with an interior surface of the chamber such that circumferential movement of the piston about said axis sweeps a fixed volume of fluid passing from the fluid inlet port to the fluid outlet port, the angular velocity of the piston in said circumferential movement varying the angle of rotation; a rotatable drive member extending outwardly of the chamber for external drive connection with the piston for communicating movement of the piston to the exterior of the chamber; and coupling means acting between the piston and the drive member, said coupling means comprising respective abutment surfaces of the piston and the drive member; wherein the point of contact between said abutment surfaces is offset radially from said axis in a direction to compensate for said variation in angular velocity.

2. A fluid device according to claim 1, wherein the abutment surface of piston is so shaped and positioned that on circumferential movement of the piston, point of said contact between the respective abutment surfaces of the coupling means follows a circular path eccentric to the axis of the chamber.

3. A fluid device according to claim 1, wherein in the abutment surface of the piston is defined by a piston drive peg which is radially offset from the cylindrical axis of the piston wall.

4. A fluid device according to any one of claims 1 to 3 comprising a flow metering device.

* * * * *